3,816,629
2-AMINO-4,6-DIPHENETHYLAMINO-S-TRIAZINE FOR TREATING ARTERIOSCLEROSIS

Tsutomu Irikura, Kyoichi Higo, Akitoshi Maeda, Fumihiko Morinaga, and Takeshi Naruke, Tokyo, Japan, assignors to Kyorin Seiyaku Kabushiki Kaisha, Tokyo, Japan
No Drawing. Application Sept. 1, 1972, Ser. No. 285,680, which is a continuation-in-part of abandoned application Ser. No. 134,394, Apr. 15, 1971. Divided and this application Feb. 12, 1973, Ser. No. 331,861
Int. Cl. A61k 27/00
U.S. Cl. 424—249                                    1 Claim

ABSTRACT OF THE DISCLOSURE

The present invention relates to a valuable medicament for oral administration containing 2-amino-4,6-diphenethylamino-s-triazine as an effective ingredient. The drug of this invention is useful for reducing serum cholesterol level and for preventing arteriosclerosis.

---

This is a division of application Ser. No. 285,680, filed on Sept. 1, 1972, which in turn is a continuation-in-part of application Ser. No. 134,394, filed on Apr. 15, 1971, now abandoned.

This invention relates to pharmaceutical compositions; more particularly it relates to pharmaceutical compositions which may be of use for the reduction of serum cholesterol and/or the suppression of arteriosclerosis.

The compound, 2-aminno - 4,6 - diphenethylamino-s-triazine, is described by Hans Suter and Hans Zutter in Helvetica Chimica Acta, 48 (8), 1940–1944 (1965) These authors synthesized twelve s-triazine derivatives expecting to obtain anti-diabetic agents which could be administered orally (derivatives of s-triazine were formed by ring closure of biguanides which had been already known to reduce the blood sugar level). However, as described in the report, they found no effective anti-diabetic agents.

2-Amino-4,6-diphenethylamino-s-triazine was one of the twelve compounds, but no details of its preparation were given, nor was the compound shown to possess any pharmacological activity.

The investigations which lead to the discovery of the present invention were also concerned with s-triazine derivatives, but for reasons quite different from those of Hans Suter and Hans Zutter. Recently, it was found that certain novel derivatives of s-triazine could suppress the abnormally enhanced activity of the reticuloendothelial system of animals induced by bacterial endotoxin. It was also found that there exists a relationship between this effect on hyperfunction of the reticuloendothelial system and the therapeutic effect of the derivatives on arteriosclerosis. These novel s-triazine derivatives prevent the deposition of lipids on the arterial wall without reducing the serum cholesterol level. In order that the mechanism of the anti-arterioschlerotic action and the structure activity relationship of s-triazine derivatives could be further investigated.

Other s-triazine derivatives were synthesized and tested to see whether they had any particular actions on experimental arteriosclerosis. This investigation revealed the unexpected fact that some of the s-triazine derivatives shown the ability to reduce the serum cholesterol level. In particular, it was found that 2-amino-4,6-diphenethylamino-s-triazine suppresses the bio-synthesis of cholesterol in the liver, reduces the serum cholesterol level and prevents the experimental arteriosclerosis.

This compound is the first s-triazine derivative, which has been found to possess such pharmaceutical activity.

Before the compound of this invention can be used medically, it must, of course, be formed into a pharmaceutical composition by association with a suitable pharmaceutical vehicle.

The term "pharmaceutical" is used herein to exclude any possibility that the nature of the vehicle, considered of course, in relation to the route by which the composition is intended to be administered, could be harmful rather than beneficial.

The choice of a suitable mode of presentation, together with an appropriate vehicle, is believed to be within the competence of those accustomed to the preparation of pharmaceutical formulations.

Accordingly this invention provides a pharmaceutical composition which comprises 2-amino-4,6-diphenethylamino-s-triazine in association with a suitable pharmaceutical vehicle.

The compositions of this invention may be administered orally and in respect of these modes, the "pharmaceutical vehicle" is preferably: the ingestible excipient of a tablet, coated tablet, sublingual tablet or pill; the ingestible container of a capsule or cachet; the ingestible pulverulent solid carrier of a powder; or the ingestible liquid medium of a syrup, solution, suspension or elixir.

In order further to illustrate this invention but without being limited thereto, the following examples are given:

EXAMPLE 1

Preparation of 2-amino-4,6-diphenethylamino-s-triazine 3.3 g. of 2-amino-4,6-dichloro-s-triazine were suspended in 100 ml. of water and 9.7 g. of phenethylamine were added dropwise, with stirring, for 2 hours. After cooling the reaction mixture, the precipitate was separated and recrystallized from isopropanol to give 6.0 g. of 2-amino-4,6-diphenethylamino-s-triazine in the form of colourless needles having a melting point of 140–142° C.

Aanalysis for $C_{19}H_{22}N_6$—Calculated (percent): C, 68.24; H, 6.63; N, 25.13. Determined (percent): C, 68.10; H, 6.54; N, 25.25.

EXAMPLE 2

Tablets are prepared by mixing and granulating in accordance with known pharmaceutical techniques the following ingredients.

| Ingredient: | Mg./tablet |
|---|---|
| 2-Amino-4,6-diphenethylamino-s-triazine | 50 |
| Lactose | 7 |
| Crystalline cellulose | 25 |
| Potato starch | 15 |
| Magnesium stearate | 0.5 |
| Hydroxypropyl cellulose | 2.5 |

EXAMPLE 3

Tablets are prepared by mixing and granulating in accordance with known pharmaceutical techniques, for example using the following ingredients.

| Ingredient: | Mg./tablet |
|---|---|
| 2-Amino-4,6-diphenethylamino-s-triazine | 60 |
| Lactose | 26 |
| Crystalline cellulose | 37.5 |
| Potato starch | 22.5 |
| Magnesium stearate | 0.75 |
| Hydroxypropyl cellulose | 3.25 |

EXAMPLE 4

Capsules are prepared in accordance with known pharmaceutical techniques from the following ingredients.

| Ingredient: | Mg./capsule |
|---|---|
| 2-Amino-4,6-diphenethylamino-s-triazine | 50 |
| Lactose | 148 |
| Crystalline cellulose | 30 |
| Potato starch | 50 |
| Magnesium stearate | 2 |

EXAMPLE 5

Capsules are prepared in accordance with known pharmaceutical techniques, for example using the following ingredients.

| Ingredient: | Mg./capsule |
|---|---|
| 2-Amino-4,6-diphenethylamino-s-triazine | 60 |
| Lactose | 138 |
| Crystalline cellulose | 30 |
| Potato starch | 50 |
| Magnesium stearate | 2 |

EXAMPLE 6

One pulverulenta is prepared in accordance with known pharmaceutical techniques from the following ingredients.

| Ingredient: | Mg./pulverulenta |
|---|---|
| 2-Amino-4,6-diphenethylamino-s-triazine | 50 |
| Lactose | 450 |

EXAMPLE 7

A suspension for oral administration is prepared in accordance with known pharmaceutical techniques from the following ingredients.

Ingredient:
- 2-Amino-4,6-diphenethylamino-s-triazine _____ mg __ 50
- Sodium carboxymethyl cellulose _____ mg __ 300
- Simple syrup _____ ml __ 60

EXAMPLE 8

Granules are prepared in accordance with known pharmaceutical techniques from the following ingredients.

| Ingredient: | Mg. |
|---|---|
| 2-Amino-4,6-diphenethylamino-s-triazine | 200 |
| Lactose | 550 |
| Potato starch | 150 |
| Crystalline cellulose | 100 |
| 3% polyvinyl alcohol 205/H$_2$O, proper quantity. | |

EXPERIMENT A

The effect of 2-amino-4,6-diphenethylamino-s-triazine on the serum chlorestrol level in mice fed a cholesterol-enriched diet Male dd-strain mice, 8 weeks old and weighing 20–23 g., were employed. These were divided into 3 groups. One group (the normal group) was fed a basal diet, the second group (the control group) was fed a cholesterol-enriched diet (the basal diet with the addition of 2% of chlorestrol and 0.1% of cholic acid), whilst the third group was fed the basal diet with the addition of 2% of cholesterol, 0.1% of cholic acid and 0.0714% of 2-amino-4,6-diphenethylamino-s-triazine. All the mice were fed those diets for 14 days and were decapitated on the 14th day. Whole blood was collected and the total chorestrol in the serum was determined by the Zak and Henly method; the results are shown in Table I. This Table clearly shows that 2-amino-4,6-diphenethylamino-s-triazine significantly suppresses the increase in the serum cholesterol level in the mice fed a cholesterol-enriched diet.

TABLE I

| Group | Number of mice in group | Increase of body weight (gm.) | Food intake (gm./kg./day) | Dose of cholesterol (gm./kg./day) | Total cholesterol in serum (mg. percent) (mean±S.D.) | Rate of suppression [a] (percent) |
|---|---|---|---|---|---|---|
| Normal | 9 | 0.6 | 160.6 | 0 | 173.3±22.5 | |
| Control | 10 | 2.7 | 189.7 | 3.794 | 270.1±31.9 | |
| 2-amino-4,6-diphenethylamino-s-triazine | 8 | 1.1 | 163.2 | 3.264 | [b] 215.4±30.0 | 56.5 |

[a] The rate of suppression was calculated by the following equation:

$$\text{Rate of suppression} = \frac{(\text{Total serum cholesterol of controls}) - (\text{Total serum cholesterol of mice receiving 2-amino-4,6-diphenethylamino-s-triazine})}{(\text{Total serum cholesterol of controls}) - (\text{Total serum cholesterol of normals})} \times 100$$

[b] Significantly lower than the control group (P<0.005).

EXPERIMENT B

Effect of 2-amino-4,6-diphenethylamino-s-triazine on the serum cholesterol level in normal rats Male Wistar strain rats, 10 weeks old and weighing 236–300 g., were employed. The tests were conducted with three groups of rats; these three groups were fed diets containing 0.0% (as control), 0.1% and 0.3% of 2-amino-4,6-diphenethylamino-s-triazine respectively. The rats were all fed for 14 days and decapitated on the 14th day. Their serum cholesterol levels were then determined as in Experiment A above. The results are shown in Table II.

TABLE II

| Proportion of 6-amino-4,6-diphenethyl-amino-s-triazine in diet (percent) | Number of rats in group | Increase of body weight (gm.) | Dose of compound (mg./kg./day) | Weight of liver (gm./100 g. body weight) (mean±S.D.) | Cholesterol in serum (mg. percent) (mean±S.D.) |
|---|---|---|---|---|---|
| 0.0 | 6 | 23.0 | 0 | 3.821±0.121 | 91.8±8.3 |
| 0.1 | 5 | 3.6 | 58.5 | 4.310±0.630 | 100.2±26.6 |
| 0.3 | 6 | 13.3 | 204.9 | 5.513±0.316 | * 79.6±7.0 |

* Significantly lower than control group (P<0.025).

EXPERIMENT C

Suppression of the bio-synthesis of chorestrol in the liver of rats by 2-amino-4,6-diphenethylamino-s-triazine Male Wistar strain rats which were fed for 7 days with diets containing 0.1% and 0.3% respectively of 2-amino-4,6-diphenethylamino-s-triazine, were compared with rats which were fed for the same period on the diet without the addition of this compound. On the 8th day, these rats were given 1 ml. per 200 g. body weight of 1–$^{14}$C acetate (20 µcurie/20 µmole per 1 ml. solution), by injection in the tail vein, and the rats were killed 60 minutes later. Their livers were separated and hydrolysed at 80° C. with 5 ml. of 10% alcoholic potassium hydroxide solution per 1 gm. of liver for 3 hours.

The solution obtained after the hydrolysis was evaporated, and the cholesterol was extracted from the residue with three 30 ml. of petroleum ether. The petroleum ether fraction was evaporated to dryness, and the residue was then dissolved in 10 ml. of petroleum ether; 5 ml. of this solution was put into a test-tube, evaporated to dryness, and dissolved in 2 ml. of acetone.

To this solution was added 4 ml. of a 1% solution of digitonin in 50% aquenous ethanol and the mixture was left overnight to form the digitonide. The digitonide was washed twice with 75% aqueous ethanol, dissolved in 3 ml. of pyridine and diluted to 10 ml. with dioxane. 2 ml. of the solution was added to 10 ml. of dioxane scintillator to estimate the activity. The results are shown in Table III; this Table clearly shows that 2-amino-4,6-diphenethylamino-s-triazine suppresses the bio-synthesis of cholesterol from acetate in the liver.

this test. One group (the normal group) was fed a basal diet.

The second group (the control group) was fed a cholesterol-enriched diet (the basal diet with the addition of 2% of cholesterol).

The third group (the test group) was fed the diet with the addition of 0.2% of 2-amino-4,6-diphenethylamino-s-triazine and 2% of cholesterol in the basal diet. All rabbits were fed for 80 days, then sacrificed and examined. Atherosclerotic lesions were macroscopically graded on a scale of 0 to 5, according to the severity of atheromatous plaque. The results are shown in Table IV. The serum cholesterol level was not changed by the administration of 2-amino - 4,6 - diphenethylamino-s-triazine, but the compound markedly decreased the cholesterol levels in the main artery and in the liver. The macroscopic examination also revealed that the title compound suppresses the development of arteriosclerosis

TABLE IV

| Group | Weight of liver (gm.) | Choresterol in liver (mg./gm.) (mean+S.D.) | Atheromata (graded 0-5) | | | Cholesterol in main artery (mg./gm.) (mean+S.D.) |
|---|---|---|---|---|---|---|
| | | | Arch. | Thrac. | Abdom. | |
| Normal | 88±8 | 2.50±0.16 | 0 | 0 | 0 | 1.65±0.28 |
| Control | 151±14 | 23.49±2.65 | 4.4 | 3.3 | 2.0 | 19.87±2.47 |
| Test | 140±20 | a14.29±3.82 | 2.5 | 1.2 | 0.4 | b7.38±2.10 | a Significant decrease (P<0.01) in comparison with the control group.
b Significant decrease (P<0.02) in comparison with the control group.

TABLE III

| Proportion of 2-amino-4,6-diphenethylamino-s-triazine in diet (percent) | Number of animals | Total d.p.m.a | d.p.m./g.m. liver (mean+S.E.) |
|---|---|---|---|
| 0.0 | 8 | 18.65×10³ | (2.72±0.97)×10³ |
| 0.1 | 8 | 7.76×10³ | (0.80±0.14)×10³ |
| 0.3 | 8 | 9.26×10³ | (0.76±0.19)×10³ | a "d.p.m." is an abridgement of "decay per minute."

EXPERIMENT

Effect of 2-amino-4,6-diphenethylamino-s-triazine on experimental arteriosclerosis in rabbits Three groups, each containing 5 rabbits, were used in

What is claimed is:

1. The method of treating arteriosclerosis in a human which comprises administering to a human in need of said treatment from about 10 to 500 mg. doses of 2-amino-4,6-diphenethylamino-s-triazine.

References Cited

Suter et al., Helvetica Chimica Acta, vol. 48, 1965, pp. 1940–1944.

JEROME D. GOLDBERG, Primary Examiner